United States Patent [19]

Hammer et al.

[11] 4,176,551

[45] Dec. 4, 1979

[54] FIBER-OPTIC THERMOMETER

[75] Inventors: Jacob M. Hammer, Plainsboro, N.J.; Clyde C. Neil, Levittown, Pa.

[73] Assignee: RCA Corporation, New York, N.Y.

[21] Appl. No.: 949,428

[22] Filed: Oct. 10, 1978

[51] Int. Cl.² .............................................. G01K 5/32
[52] U.S. Cl. ................................. 73/339 R; 73/355 R; 73/368
[58] Field of Search ................. 73/339 R, 353, 355 R, 73/355 EM, 356, 362 R, 368, 368.1, 368.2, 368.3, DIG. 11; 250/343, 344, 345, 577; 356/135, 136

[56] References Cited

U.S. PATENT DOCUMENTS

| 3,639,770 | 2/1972 | Zizelmann | 356/136 X |
| 3,810,065 | 5/1974 | Welsh | 73/368 X |
| 3,871,232 | 3/1975 | Pickett et al. | 73/356 |
| 3,960,017 | 6/1976 | Romanowski | 73/362 R |
| 4,016,761 | 4/1977 | Rozzell et al. | 73/356 |
| 4,036,060 | 7/1977 | Deficis | 73/368 |
| 4,111,050 | 9/1978 | Waddoups | 73/356 X |
| 4,136,566 | 1/1979 | Christensen | 73/356 |

*Primary Examiner*—Donald Watkins
*Attorney, Agent, or Firm*—Samuel Cohen; George J. Seligsohn

[57] ABSTRACT

A species of fiber-optic thermometer, employing a gas-sealing movable reflecting element trapping a sealed gas column in a capillary as a temperature-sensitive medium, transfers a proportion of fiber-optic input light to a fiber-optic output as a single-valued function of temperature. This species provides a miniature thermometer exhibiting high temperature sensitivity.

8 Claims, 5 Drawing Figures

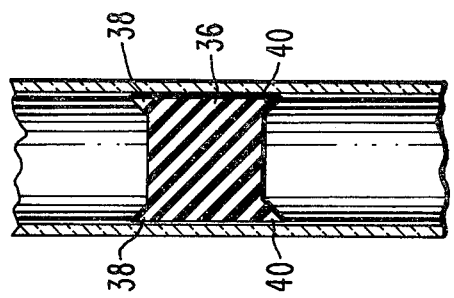
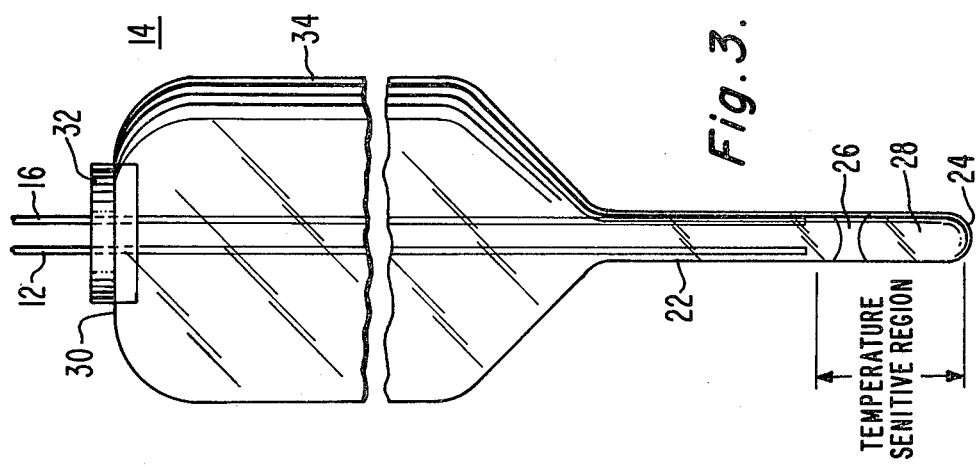
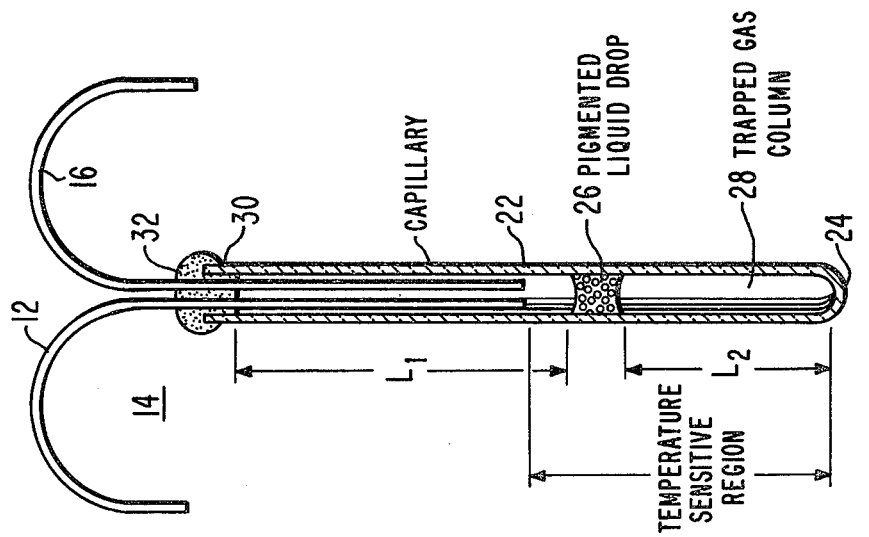

FIBER-OPTIC THERMOMETER

This invention relates to fiber-optic thermometers and, more particularly, to a species of fiber-optic thermometer employing a temperature-sensitive medium which includes a trapped gas.

The need for a remotely read thermometer having a miniature size temperature-sensitive region has been recognized. For instance, the electromagnetic localized heating (hyperthermia) of cancerous tissue requires a miniature, non-conductive thermometer to indicate the temperature of the heated tissue. Such a miniature, non-conductive thermometer is also useful in connection with a microwave oven.

To meet such needs, a fiber-optic thermometer already has been proposed. As known in the art, a fiber-optic thermometer comprises a fiber-optic input for applying input light, a fiber-optic output for extracting output light, and a temperature-sensitive medium optically coupling the fiber-optic input to the fiber-optic output for transferring a proportion of the applied input light from the fiber-optic input to the fiber-optic output. Since the size of the transferred proportion is a single-valued function of the temperature of the medium, the temperature may be indicated by detecting the amount of extracted output light. In the past, the temperature-sensitive medium has comprised a reflecting liquid having a predetermined temperature coefficient of expansion. In particular, the spacing distance between the surface of this liquid and the respective fiber-optic input and fiber-optic output varies with temperature. Therefore, the proportion of input light from the fiber-optic input that is reflected from the surface of the liquid into the fiber-optic output is a single-valued function of the aforesaid spacing distance and, hence, of the temperature of the liquid.

The problem with this known species of fiber-optic thermometer is that it exhibits a low temperature sensitivity. One reason for this low temperature sensitivity is that any type of fiber-optic thermometer which depends on the spacing distance of a reflecting surface from the fiber-optic input and the fiber-optic output inherently exhibits a small optical coupling coefficient between the fiber-optic input and the fiber-optic output (i.e., the slope defined by the ratio of the percentage change in output light extracted from the fiber-optic output to the change in the spacing distance is inherently small). A new species of fiber-optic thermometer that also employs a liquid as the temperature sensitive medium, but exhibits a relatively high optical coupling coefficient, forms the subject matter of U.S. Patent application Ser. No. 949,435 (RCA 72,769), filed on even date herewith by Hammer and assigned to the same assignee as the present application.

Another reason for the low temperature sensitivity of the known species of fiber-optic thermometer employing a liquid as the temperature sensitive medium involves the inherent relatively small temperature coefficient of expansion of a liquid. One solution to this problem is to place the liquid in an enclosure comprising at its base a relatively large bulb supporting a narrow capillary. In this case, even a small change in volume of the liquid results in a relatively large change in the aforesaid spacing distance between the liquid surface and the fiber-optic input and fiber-optic output, since this surface is within the narrow capillary. However, the trouble with this obvious solution is that the temperature-sensitive region of the thermometer requires a relatively large liquid-filled bulb. One of the primary benefits of a fiber-optic thermometer is the miniature size of its temperature sensitive region. The presence of this required relatively-large liquid-filled bulb destroys this benefit.

The improved fiber-optic thermometer disclosed and claimed herein utilizes as a temperature-sensitive medium a gas-sealing movable reflecting element disposed within a capillary that has one end thereof sealed. Situated between the sealed end of the capillary and the reflecting element is a column of trapped gas. The element is supported by the pressure and moved by changes in the pressure of the trapped gas, whereby the length of the gas column and, hence, the position of the element along the length of the capillary is determined by the temperature of the gas. Thus, while the fiber-optic thermometer of the present invention inherently still has a relatively small optical coupling coefficient, the large ratio of the change in spacing distance per degree of change in temperature of a trapped gas column is capable of providing a relatively high temperature sensitivity, while still providing a temperature-sensitive region which is miniature in size.

In the drawings:

FIG. 2 illustrates one embodiment of a fiber-optic thermometer incorporating the present invention;

FIG. 3 illustrates another embodiment of a fiber-optic thermometer incorporating the present invention, and FIG. 4 illustrates the use of a solid piston, rather than a liquid drop, as the movable reflecting element of the embodiment of either FIG. 2 or FIG. 3.

Figure 1:
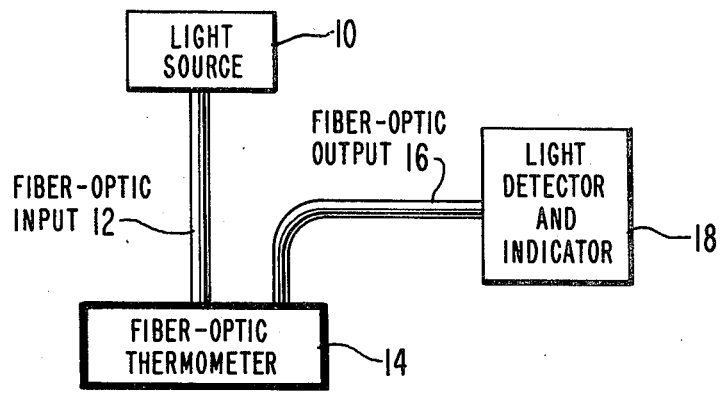
FIG. 1 is a block diagram of a fiber-optic thermometer system.

Referring to FIG. 1, light from light source 10 (which may be either visible or infra-red light) is transmitted by fiber-optic input 12 (which may contain one or more fiber-optic members) to a fiber-optic thermometer 14. Fiber-optic thermometer 14 is effective in transferring a proportion of the light in fiber-optic input 12 to fiber-optic output 16 (which may include one or more fiber-optic members). The size of this transferred proportion is a single-valued function of temperature. The output light of fiber-optic output 16, extracted from fiber-optic thermometer 14, is applied as an input to light detector and indicator 18. Light detector and indicator 18 includes a photoelectric detector, for deriving an electrical signal which has a magnitude which is a single-valued function of the intensity of light in fiber-optic 16, and an indicator for measuring the magnitude of this electrical signal. Since the intensity of the light in fiber-optic 16 depends on both the intensity of the light in fiber-optic input 12 and the temperature measured by fiber-optic thermometer 14, it is necessary to calibrate the indicator of light detector and indicator 18 in accordance with the absolute magnitude of the light intensity from light source 10. Although this can be done manually, it is preferably done automatically in the manner shown in FIG. 1a.

Figure 1A:
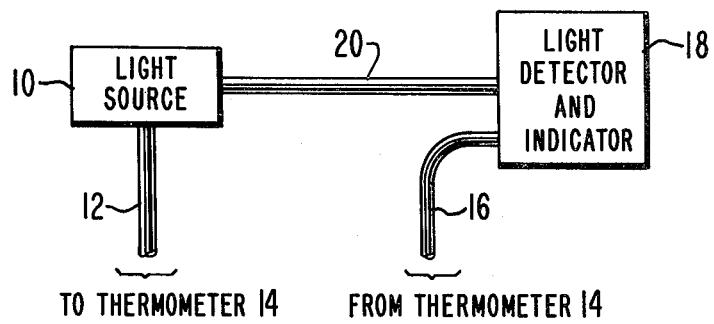
FIG. 1a illustrates a modification of the fiber-optic thermometer system of FIG. 1.

Referring to FIG. 1a, light detector and indicator 18, besides receiving output light from thermometer 14 through fiber-optic output 16, also receives reference light directly from light source 10 through fiber-optic 20. In this case, light detector and indicator 18 includes a second photoelectric detector for detecting the intensity of this reference light for normalizing purposes.

Specifically a signal derived from the second photoelectric detector may be used as a gain-control signal for making the indication from light detector and indicator 18 independent of the absolute intensity of the light from light source 10, and dependent solely on the proportion of the fiber-optic input light transferred from input 12 to output 16 (i.e., dependent solely on the temperature measured by thermometer 14).

The species of fiber-optic thermometer 14 which embodies the present invention is shown in FIG. 2. For illustrative purposes, each of fiber-optic input 12 and fiber-optic output 14 is shown as comprising only a single fiber-optic. However, it should be understood that a plurality of fiber-optics may be employed as the fiber-optic input and that a plurality of fiber-optics may be employed as the fiber-optic output. As is shown in FIG. 2, thermometer 14 comprises a length of capillary 22 having end 24 thereof sealed. Disposed within capillary 22 is a gas-sealing movable reflecting element, such as pigmented liquid drop 26, that is effective in trapping a gas column 28 between sealed end 24 and pigmented liquid drop 26. By way of example, liquid drop 26 may comprise a colloidal suspension of latex microballoons in water (similar to latex paint base) to provide a good non-specularly reflective surface. Another example of a pigmented liquid drop is a machine or other light non-oxidizing oil containing a suspended pigment, such as $TiO_2$. Trapped gas column 28 may be composed of air, by way of example. However, it should be understood that any other gaseous material may be employed.

Fiber-optic input 12 and fiber-optic 14 extend through end 30, into capillary 22, and terminate at a fixed point along the length of capillary 22. This fixed point is situated between pigmented liquid drop 26 and end 30. As will be discussed later, the length $L_1$ of gas is much larger than $L_2$ and the gas within the region of length $L_1$ is at a relatively constant temperature and its pressure changes very little. Any increase in the temperature of trapped gas column 28 increases the pressure thereof, thereby causing trapped gas column 28 to expand, which pushes pigmented liquid drop 26 to a new position closer to fiber-optic input 12 and fiber-optic output 16. Similarly, a decrease in temperature decreases the pressure of trapped gas column 28, thereby causing trapped gas column 28 to contract, which moves pigmented liquid drop 26 to a new position further away from fiber-optic input 12 and fiber-optic output 16. Thus, the length $L_2$ of trapped gas column 28 is a single-valued function of temperature. However, even at the highest operating temperature of thermometer 14, the total length of trapped gas column 28 and that of pigmented liquid drop 26 is never long enough to reach the fixed point at which fiber-optic input 12 and fiber-optic 16 terminate.

The equilibrium position of pigmented liquid drop 26 at any temperature depends not only on the pressure of trapped gas column 28, but also on the pressure in the region of capillary 22 between end 30 thereof and pigmented liquid drop 26. If end 30 of capillary 22 were left open to the outside air, the position of pigmented liquid drop 26 along the length of capillary 22 would be affected by changes in barometric pressure. This would lower the precision of which temperature could be measured by thermometer 14. Therefore, preferably, end 30 of capillary 22 is sealed by stopper 32. The presence of stopper 32 makes it essential that the length $L_1$ of the region of both pigment liquid drop 26 be large relative to the length $L_2$ of trapped gas column 28, so that changes in gas pressure be slight in the portion of capillary 22 between stopper 32 and pigmented liquid drop 26, due to movement of pigmented liquid drop 26.

The embodiment of FIG. 3 incorporates a large bulb 34 situated between stopper 32 and pigmented liquid drop 26, which defines a volume that is vastly greater than that of trapped gas column 28. The presence of bulb 34 insures that pressure changes in the region between stopper 32 and pigmented liquid drop 26, due to movement of pigmented liquid drop 26, are negligible.

In the respective embodiments of both FIGS. 2 and 3, the proportion of input light in fiber-optic input 12 which is transferred to fiber-optic 16 is a single-valued function of the spacing distance between pigmented liquid drop 26 and the termination of each of fiber-optic 12 and fiber-optic 16. The relative change in this spacing distance, due to temperature-induced changes in the length of trapped gas column 28, is large; i.e., use of a trapped gas column as the temperature-sensitive medium provides a fiber-optic thermometer with a high degree of temperature sensitivity. Further, since capillary 22 is normally only a fraction of a millimeter in diameter and the length of trapped gas column 28 may be made to be only a few millimeters, the fiber-optic thermometer of the present invention has a temperature-sensitive region which is quite miniature in size.

The gas-sealing movable reflecting elements employed in thermometer 14 need not be a pigmented liquid drop. Instead, thermometer 14 may use a solid piston. Such a piston could be made of glass, plastic, or other material that provides a gas-sealing contact with the inner diameter of capillary 22 when lubricated with a suitable oil or grease, such as a stop cock grease, to complete the seal. Preferably, however, such a solid piston should be made of rubber shaped as shown in FIG. 4. Specifically, as shown in FIG. 4, rubber piston 36 is provided with rubber skirt 38 on the top thereof and rubber skirt 40 on the bottom thereof. These rubber skirts provide a slidable but very positive gas seal for the inner diameter of capillary 22. Further, at least the upper surface of rubber piston 36 (facing fiber-optic 12 and 16) is reflective.

What is claimed is:

1. In a fiber-optic thermometer comprising a fiber-optic input for applying input light, a fiber-optic output for extracting output light, and a temperature-sensitive medium optically coupling said fiber-optic input to said fiber-optic output for transferring a proportion of the applied input light from said fiber-optic output, the size of said transferred proportion being a single-valued function of the temperature of said medium; the improvement therein;

wherein said medium comprises a gas-sealing movable reflecting element disposed within a capillary that has one end thereof sealed, and a column of trapped gas situated between said one end of said capillary and said element, said element being supported by the pressure and moved by changes in the pressure of said trapped gas, whereby the length of said gas column and, hence, the position of said element along the length of said capillary is determined by the temperature of said gas, and wherein each of said fiber-optic input and fiber-optic output extends into the other end of said capillary and terminates at a fixed point along the length of said capillary situated between said element and said other end of said capillary, whereby the proportion of applied input light transferred from said fiber-optic output by reflection from said element is a single-valued function of the position of said element along the length of said capillary.

2. The thermometer defined in claim 1, further including means coupled to said other end of said capillary for enclosing a region which includes the portion of said capillary located on the opposite side of said element from said trapped gas column.

3. The thermometer defined in claim 2, wherein the volume of said enclosed region is sufficiently large with respect to the volume of said trapped gas column that any gas enclosed within said region exhibits a negligible change in pressure due to movement of said element.

4. The thermometer defined in claim 1, wherein said element comprises a liquid drop contacting the periphery of the wall of said capillary.

5. The thermometer defined in claim 4, wherein said liquid drop is a pigmented liquid drop.

6. The thermometer defined in claim 1, wherein said element comprise solid piston contacting the periphery of the wall of said capillary.

7. The thermometer defined in claim 6, wherein said piston is composed of rubber and includes rubber skirts providing a positive gas seal in slidable engagement with said wall of said capillary.

8. The thermometer defined in claim 6, wherein said piston comprises a rigid material which is lubricated to provide a gas-seal at said wall of said capillary.

* * * * *